Oct. 13, 1931.  R. W. JOY  1,827,474
RAILWAY CAR BRAKE
Filed Dec. 8, 1928  3 Sheets-Sheet 1
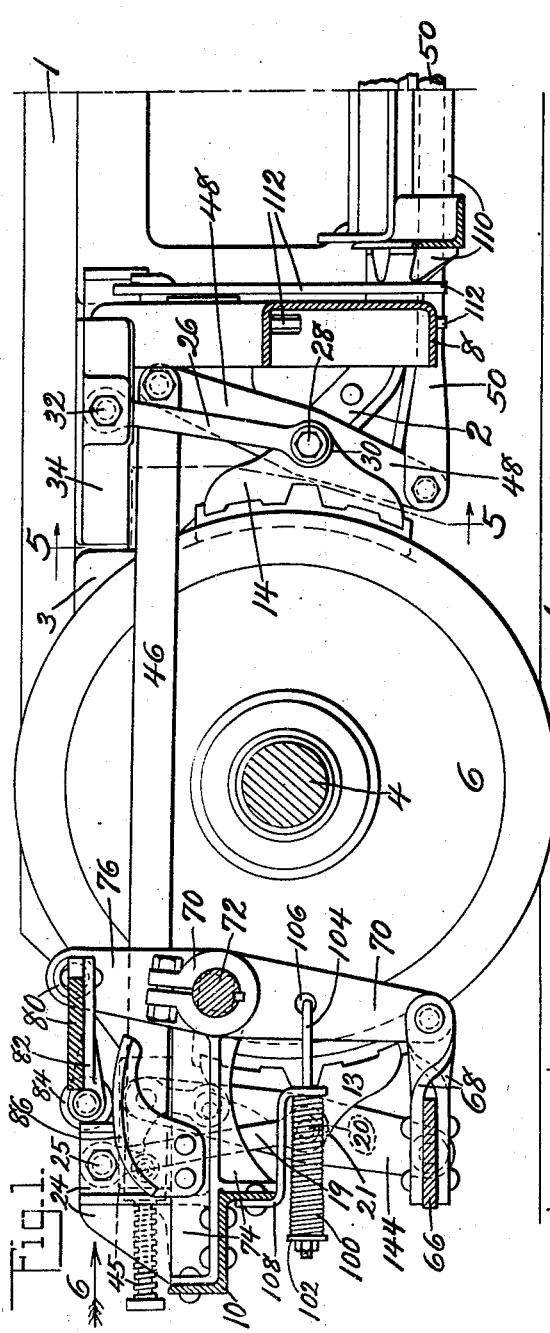
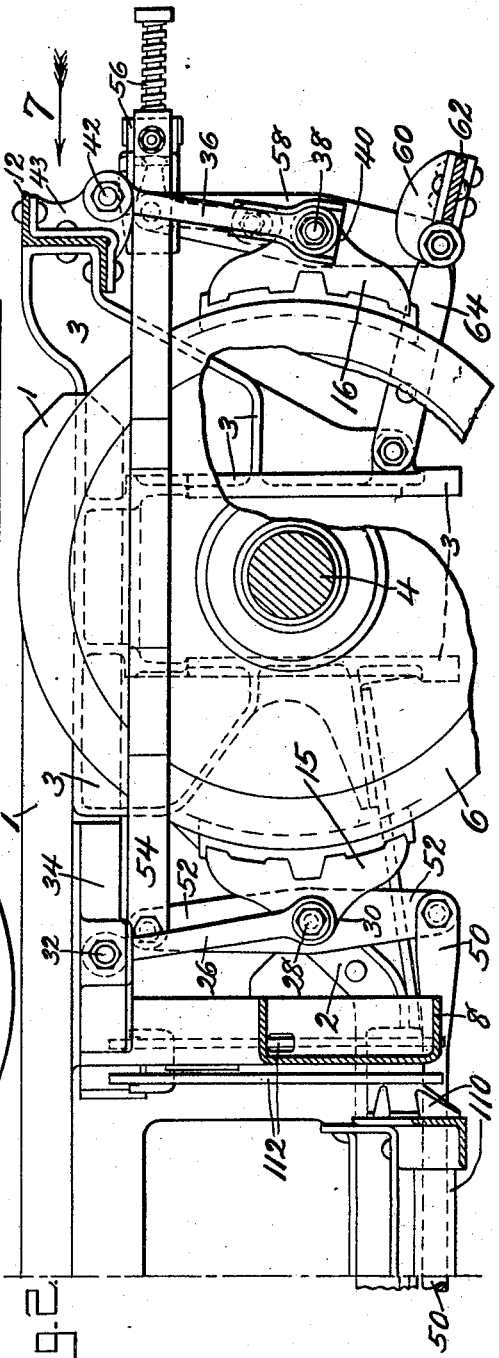
INVENTOR
Robert W. Joy
BY *F. H. Gibbs*
ATTORNEY

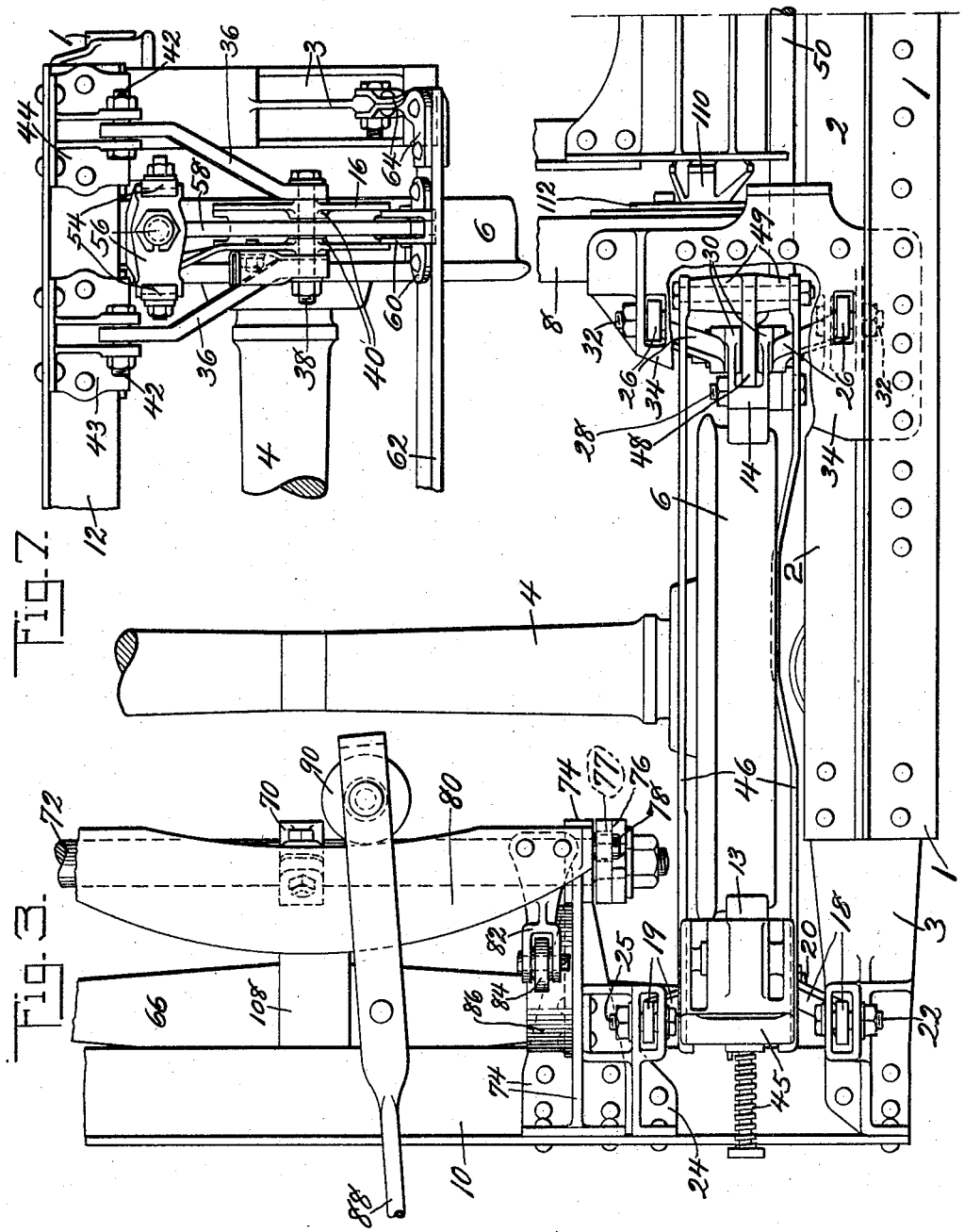

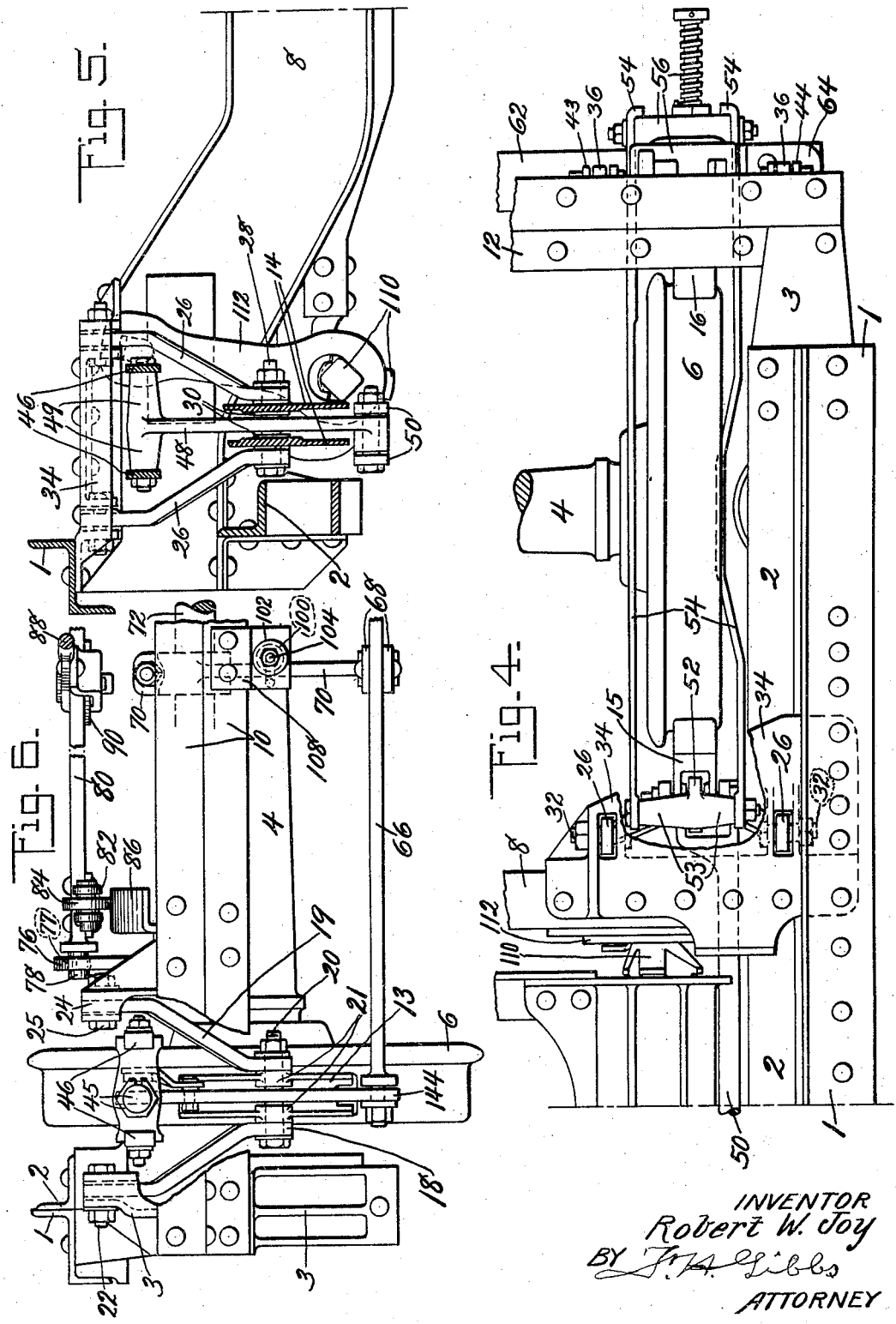

Patented Oct. 13, 1931

1,827,474

UNITED STATES PATENT OFFICE

ROBERT W. JOY, OF BROOKLYN, NEW YORK, ASSIGNOR TO AMERICAN CAR AND FOUNDRY COMPANY, OF NEW YORK, N. Y., A CORPORATION OF NEW JERSEY

RAILWAY CAR BRAKE

Application filed December 8, 1928. Serial No. 324,646.

This invention relates to brakes for railway cars and more particularly to brakes of the clasp brake type, and it is an object of this invention to provide an improved brake for railway cars which will insure equalized pressures on the wheels at opposite sides of the car truck, and it is also an object of this invention to provide an improved means for insuring equalized pressures on the wheels at opposite sides of the car truck which will be effective in all positions of the truck. It is also an object of this invention to provide an equalizing means which, while particularly adapted for use in connection with clasp brakes, may also be used with brakes of other types.

With these and other objects in view, as will appear more fully hereinafter, the invention consists substantially in the construction, combination, location and relative arrangement of the parts, all as will be more fully herein set forth, as shown in the accompanying drawings and finally pointed out in the appended claims.

In the drawings:

Figure 1 is a vertical longitudinal section of one-half of a car truck equipped with brakes constructed in accordance with this invention, the truck bolster being omitted;

Fig. 2 is a vertical longitudinal section of the other half of the car truck shown in Fig. 1;

Fig. 3 is a partial top plan view of the portion of the car truck shown in Fig. 1, the near side being shown;

Fig. 4 is a partial top plan view of the portion of the car truck shown in Fig. 2, the near side being shown;

Fig. 5 is a partial vertical transverse section taken on the line 5—5 of Fig. 1;

Fig. 6 is a partial end elevation looking in the direction of the arrow 6 in Fig. 1; and Fig. 7 is a partial end elevation looking in the direction of the arrow 7 in Fig. 2.

In the drawings the invention is shown in connection with a car truck having side frames comprising compression members 1 and tension members 2 spaced apart at their centers and joined together at their ends and connected to pedestal castings 3. The pedestal castings are formed with guides in which are mounted journal boxes, not shown, in which journal boxes are journaled axles 4 having the wheels 6 mounted thereon. Adjacent their centers the side frames are connected by transoms 8 and at their ends are connected by end frame members 10 and 12, the end frame members being secured to projections formed integral with the pedestal castings 3.

The brake system illustrated is of the clasp brake type comprising, on each side of the truck, brake heads 13, 14, 15 and 16 carrying shoes which engage opposite sides of the wheels. The brake head 13 is supported by links 18 and 19 having their lower ends provided with openings to receive a pin 20 which extends through the openings in the links 18 and 19 and through the openings in the spaced lugs 21 formed on the brake head 13. The upper ends of the links are formed with openings to receive pins, the link 18 extending into an opening between lugs formed integral with the pedestal casting 3 and receiving a pin 22 mounted in openings in the lugs. The link 19 extends into an opening formed in a bracket 24 attached to the frame end member 10 and having lugs provided with openings to receive pin 25 which engages in the opening in the link 19. The brake heads 14 and 15 are supported by links 26 having openings at their lower end to receive pins 28 which engage in openings in the lugs 30 on the brake heads while the upper ends of the links are formed with openings receiving pins 32 engaging in openings in lugs formed integral with the link supporting plates 34 attached to the transoms 8 and compression members 1. The brake head 16 is supported by links 36 having openings at their lower ends to receive pins 38 engaging in openings in the lugs 40 of the brake heads while the upper ends of the links are provided with openings to receive pins 42 engaging in openings in brackets 43 and 44 attached to the frame end member 12.

Pivotally mounted on pin 20 between the lugs 21 of the brake head 13 is a brake lever 144 having its upper end pivotally connected through a slack adjuster 45 with the spaced tension members 46 the other ends of which are connected with the upper end of a brake lever 48 pivotally mounted on pin 28 between the lugs 30 of the brake head 14. The lower end of the brake lever 48 is connected by a compression member 50 to the lower end of a brake lever 52, which is pivotally mounted on pin 28 between the lugs 30 of the brake head 15. The upper end of the brake lever 52 is pivotally connected to the spaced tension members 54 the opposite ends of which are pivotally connected through slack adjuster 56 to the upper end of brake lever 58. The brake lever 58 is pivotally mounted on pin 38 between the lugs 40 of the brake head 16 and has its lower end pivotally connected to a bracket 60 attached to a brake beam 62, the end of the brake beam being connected through links 64 to the pedestal casting 3. It will be understood that any suitable or desired slack adjuster may be used to connect levers 144 and 58 to the tension members 46 and 54, respectively, but the slack adjusters illustrated are shown and described in my application, Serial No. 277,159, filed May 12, 1928.

The upper ends of the brake levers 48 and 52 are provided with outwardly projecting arms 49 and 53, respectively to engage with the spaced tension members 46 and 54 which extend on opposite sides of the wheels and the lower ends of these brake levers are provided with arms extending to one side permitting the use of an offset yoke in connection with the compression member 50 to provide a clearance for the adjustable spring plank supports 110 mounted in the swing links 112.

The lower end of brake lever 144 is connected to a brake beam 66 which is connected at its center by links 68 to the free end of a lever arm 70 fixed on a torsion shaft 72. The torsion shaft 72 is journaled in brackets 74 attached to the frame end member 10, and at its ends is provided with lever arms 76 having openings 77 in their free ends in which are received the rounded ends 78 formed on the radius bar 80. The radius bar is provided with brackets 82 in which are mounted rollers 84 which travel on curved guides 86 attached to the brackets 74, the curvature of the guides 86 corresponding with the travel of the upper ends of the lever arms 76 so that the radius bar 80 is maintained in a horizontal position throughout all its movements. Movement is imparted to the radius bar 80 through a connection 88 having a roller 90 which engages the radius bar 80. The connection 88 leads to the brake cylinder and permits of the swinging of the truck on curves without changing the direction of pull of the connection 88. To return the brakes to release position, there is provided a rod 104 which engages in an opening 106 in the lever arm 70 and projects through an opening in a bracket 108 attached to the frame end member 10. Mounted on the rod 104 is a spring 100 confined between the bracket 108 and a washer 102 secured on the rod 104.

In operation, application of pressure to the connection 88 will cause the radius bar 80 through the lever arms 76 to rotate the torsion shaft 72 and operate the lever arm 70 which, through the links 68, will operate the brake beam 66, applying pressure to the brake levers 144 and engaging the brake shoes carried by the brake heads 13 with the wheel. The levers 144 will pivot about the pins 20 and through the tension members 46, brake levers 48, compression members 50, brake levers 52, tension members 54 and brake lever 58 apply the shoes carried by the brake heads 14, 15 and 16 to the wheels. It will be noted that no matter what the position of the truck with respect to the car body and the resultant application of the pressure through the connection 88 to one side or the other of the radius bar 80 that, because of the lever arms 76 and torsion shaft 72, the braking pressure is always applied through the lever arm 70 to the center of the brake beam 66, and thus is applied equally to the brake shoes at the opposite sides of the truck.

While the preferred form of the invention has been shown and described, it is to be understood that the invention is not limited to the exact details of construction shown and described as it is obvious that various modifications thereof within the scope of the claims will occur to persons skilled in the art.

What is claimed is:

1. In a railway brake, a brake beam, a torsion shaft connected to said beam and a radius bar operatively connected to said shaft.

2. In a railway brake, a brake beam, a torsion shaft connected to said beam at the center of the latter and a radius bar operatively connected to said shaft.

3. In a railway brake, a brake beam, a torsion shaft connected to said beam and a radius bar having its ends operatively connected to said shaft.

4. In a railway brake, a brake beam, a torsion shaft connected to said beam at the center of the latter and a radius bar having its ends operatively connected to said shaft.

5. In a railway brake, a brake beam, a torsion shaft connected at its center to the center of said beam and a radius bar having its ends operatively connected to the ends of said shaft.

6. In a railway brake, a brake beam, brake shoe levers connected to the ends of said beam, a shaft connected at its center to the center of said beam, a radius bar having its ends connected to the ends of said shaft and a power connection to said radius bar.

7. In a railway brake, a brake beam, a shaft, a radius bar, a connection between said shaft and said brake beam at the center thereof, and lever arms on said shaft connected to the ends of said radius bar.

8. In a railway brake, brake heads, links supporting said brake heads, brake levers connected to said brake heads, a brake beam connecting said levers, a shaft having a lever arm connected to said brake beam at the center thereof, a radius bar and lever arms on the ends of said shaft connected to the ends of said radius bar.

9. In a railway brake, brake heads on opposite sides of the car wheels, links supporting said brake heads, brake levers connected to said brake heads, rods connecting adjacent brake levers, brake beams connecting the lower ends of opposite outside brake levers, links connecting one of said brake beams to the truck frame, a shaft, a radius bar, a lever arm at the center of said shaft connected to the center of the other brake beam, lever arms at the ends of said shaft connected to the ends of said radius bar and a power connection to said radius bar.

10. In a railway brake, brake heads on opposite sides of the car truck, links supporting said brake heads, brake levers connected to said brake heads and supported thereby, a brake beam connecting said brake levers, a shaft, a radius bar, a connection between said brake beam and shaft at the centers thereof, connections between said shaft and radius bar at the ends thereof and guides for the ends of said radius bar.

11. In a railway brake, a brake beam, a shaft connected to said beam, a radius bar operatively connected to said shaft and guides for said radius bar curved to hold said radius bar parallel to its original position during movement of said radius bar.

12. In a railway brake, a brake beam, a shaft connected to said beam, crank arms carried by said shaft, a radius bar pivotaly connected to said crank arms and guides for said radius bar curved to approximate the path of movement of the points of connection of said radius bar and crank arms.

13. In a railway brake, a brake beam, a shaft, a radius bar, crank arms fixed to said shaft and connected to said brake beam and radius bar and curved guides for said radius bar to hold said radius bar parallel to its original position during movement of said radius bar.

14. In a railway truck, a brake beam, a shaft connected to said beam, a radius bar operatively connected to said shaft, and guides cooperating with said radius bar during its movement for maintaining said bar parallel to its original position.

15. A brake for use with a car truck comprising a brake beam, a shaft connected thereto, a radius bar operatively connected to said shaft, and guides secured to a truck part and curved to maintain said radius bar parallel to its original position during movement of said bar.

16. In a railway brake, a brake beam, a radius bar, and means operatively connecting the radius bar and brake beam for transmitting force to a point substantially midway between the ends of said brake beam.

17. In a railway brake, a brake beam, a radius bar, a torsion shaft adapted to be shifted by the radius bar, and means connecting the torsion shaft and brake beam for applying force to the said brake beam at a point substantially midway between the ends thereof to actuate said brake beam.

18. In a railway brake, brake shoes, a brake beam for actuating said shoes, a radius bar, means for applying force to the radius bar at various points to shift said bar horizontally, and an equalizing operative connection between the radius bar and said brake beam adapted to actuate the brake shoes uniformly regardless of the point of application of force to said radius bar.

19. In a railway truck, in combination with a brake beam, brake shoes adapted to be actuated thereby, and a radius bar, means for applying uniform force to the brake shoes comprising a connection between said radius bar and brake beam for applying force to the latter at a point substantially midway between the brake shoes.

In witness whereof I have hereunto set my hand.

ROBERT W. JOY.